US012280531B2

(12) United States Patent
Usami (10) Patent No.: US 12,280,531 B2
(45) Date of Patent: Apr. 22, 2025

(54) MOLD, BLOW MOLDING DEVICE, AND INJECTION MOLDING DEVICE

(71) Applicant: NISSEI ASB MACHINE CO., LTD., Nagano (JP)

(72) Inventor: Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 96 days.

(21) Appl. No.: 17/795,439

(22) PCT Filed: Jan. 28, 2021

(86) PCT No.: PCT/JP2021/003043
§ 371 (c)(1),
(2) Date: Oct. 26, 2022

(87) PCT Pub. No.: WO2021/153671
PCT Pub. Date: Aug. 5, 2021

(65) Prior Publication Data
US 2023/0049178 A1 Feb. 16, 2023

(30) Foreign Application Priority Data
Jan. 31, 2020 (JP) .................. 2020-015318

(51) Int. Cl.
*B29C 49/06* (2006.01)
*B29C 33/60* (2006.01)
(Continued)

(52) U.S. Cl.
CPC .............. *B29C 49/32* (2013.01); *B29C 33/60* (2013.01); *B29C 49/42* (2013.01);
(Continued)

(58) Field of Classification Search
CPC ..... B29C 49/06; B29C 49/36; B29C 49/4802; B29C 49/42; B29C 2049/4807;
(Continued)

(56) References Cited

U.S. PATENT DOCUMENTS 4,902,212 A * 2/1990 Nakamura .............. F16C 33/24
425/577
2009/0068301 A1* 3/2009 Huang .................... B29C 33/56
425/107
(Continued)

FOREIGN PATENT DOCUMENTS

DE 202006011657 U1 12/2006
EP 0 347 506 A2 12/1989
(Continued)

OTHER PUBLICATIONS

Machine translation of Ohtani (JP 2014-091321 A) dated May 2014. (Year: 2014).*
(Continued)

*Primary Examiner* — Robert B Davis
(74) *Attorney, Agent, or Firm* — GREENBLUM & BERNSTEIN, P.L.C.

(57) ABSTRACT

A mold includes a first mold for receiving a neck mold that holds a neck part of a resin preform having a bottom, and for enclosing the preform inside, and a second mold inserted into the neck mold. At least one of a first sliding surface between the neck mold and the first mold and a second sliding surface between the neck mold and the second mold includes a solid lubricant embedded therein.

5 Claims, 7 Drawing Sheets

(51) Int. Cl.
  *B29C 49/32* (2006.01)
  *B29C 49/36* (2006.01)
  *B29C 49/42* (2006.01)
  *B29C 49/48* (2006.01)
  *B29C 49/64* (2006.01)
  *B29L 31/00* (2006.01)

(52) U.S. Cl.
  CPC ........ *B29C 49/42065* (2022.05); *B29C 49/48* (2013.01); *B29C 49/4823* (2013.01); *B29C 49/6435* (2022.05); *B29C 49/062* (2013.01); *B29C 2049/4838* (2013.01); *B29L 2031/712* (2013.01)

(58) Field of Classification Search
  CPC .... B29C 2049/4889; B29C 2049/4892; B29C 2049/4874; B29C 2037/92
  USPC ........................................................ 425/107
  See application file for complete search history.

(56) References Cited

U.S. PATENT DOCUMENTS

| | | | |
|---|---|---|---|
| 2012/0108474 A1 | 5/2012 | Takano et al. | |
| 2013/0196020 A1 | 8/2013 | Nakahara | |
| 2014/0131920 A1* | 5/2014 | Nakahara | ................ B29B 11/14 264/328.16 |
| 2018/0079127 A1* | 3/2018 | Aoki | ....................... B29C 49/06 |
| 2019/0389119 A1* | 12/2019 | Bechen | ............... B29C 49/4802 |
| 2020/0009776 A1 | 1/2020 | Kumar | |
| 2021/0001535 A1 | 1/2021 | Toutoux et al. | |

FOREIGN PATENT DOCUMENTS

| | | | | |
|---|---|---|---|---|
| EP | 3590681 A1 * | 1/2020 | ......... B29C 45/2602 |
| JP | 60-134615 U | 9/1985 | |
| JP | 1-320121 A | 12/1989 | |
| JP | 8-300460 A | 11/1996 | |
| JP | 2012-92241 A | 5/2012 | |
| JP | 2013-154622 A | 8/2013 | |
| JP | 2014-91321 A | 5/2014 | |
| JP | 2014-151562 A | 8/2014 | |
| JP | 2018-16344 A | 2/2018 | |
| WO | 2018/159745 A1 | 9/2018 | |
| WO | 2019/170976 A | 9/2019 | |
| WO | 2019/194115 A1 | 10/2019 | |

OTHER PUBLICATIONS

International Search Report and Written Opinion of the International Searching Authority issued in International Patent Application No. PCT/JP2021/003043, dated Apr. 6, 2021, along with an English translation thereof.

Supplementary European Search Report dated Feb. 23, 2024 in European Application No. 21747411.3.

* cited by examiner

MOLD, BLOW MOLDING DEVICE, AND INJECTION MOLDING DEVICE

BACKGROUND OF THE INVENTION

Field of the Invention

The present invention relates to a mold, a blow molding apparatus, and an injection molding apparatus.

Description of the Related Art

Blow molding ("hot parison" process) apparatuses are one of commonly known apparatuses for producing resin containers. In a "hot parison" process blow molding apparatus, preforms are blow-molded into resin containers as the preforms are intermittently transferred sequentially from one to another of an injection molding unit, a temperature adjusting unit, and a blow molding unit, on a rotating transfer plate. The above blow molding apparatus forms resin containers by utilizing the residual heat contained in injection-molded preforms, which offers advantage over a "cold parison" process in producing a wide variety of resin containers with good appearance.

For the molds used for injection molding, there have been proposed a configuration, for example, in which solid lubricants are embedded in each of sliding surfaces of guide holes used for guiding a mold when the mold is opened and closed, and sliding surfaces of a sliding mold (e.g., JP 1-320121 A), and a configuration in which a lubricant-impregnated member is accommodated in a groove formed in a surface that makes contact with a moving mold used for removing the molded piece from a core (e.g., JP 60-134615 Y).

The mold used in the blow molding apparatus described above is made up of a plurality of mold components, many of which are driven by actuators. These mold components must be positioned precisely relative to the preform when the mold is closed for favorable molding of the preforms or resin containers.

In the above blow molding apparatus, mold components that face each other have inclined surfaces, for example, which slide against one another, to ensure accuracy in positioning the mold components that hold and transfer the preforms and other mold components. In such a case, it is essential to apply a lubricant on the sliding surfaces so as to prevent abnormal wear (galling) of the mold components. Application of lubricant to numerous parts of a blow molding apparatus is a cumbersome task. Absence of lubricant by oversight can significantly increase risk of damage to the mold components.

SUMMARY OF THE INVENTION

The present invention in one aspect resides in a mold including a first mold for receiving a neck mold that holds a neck part of a resin preform having a bottom, and for enclosing the preform inside, and a second mold inserted into the neck mold, at least one of a first sliding surface between the neck mold and the first mold and a second sliding surface between the neck mold and the second mold including a solid lubricant embedded therein.

Further features of the present invention will become apparent from the following description of exemplary embodiments with reference to the attached drawings.

DESCRIPTION OF THE EMBODIMENTS

One embodiment of the present invention is described below with reference to the drawings.

For ease of understanding of the embodiment, description of the structures and elements other than primary features of the present invention will be simplified or omitted. Same elements in the drawings are given the same reference numerals. It should be understood that the drawings are schematics of various elements and not illustrations of actual shapes and dimensions.

Figure 1:
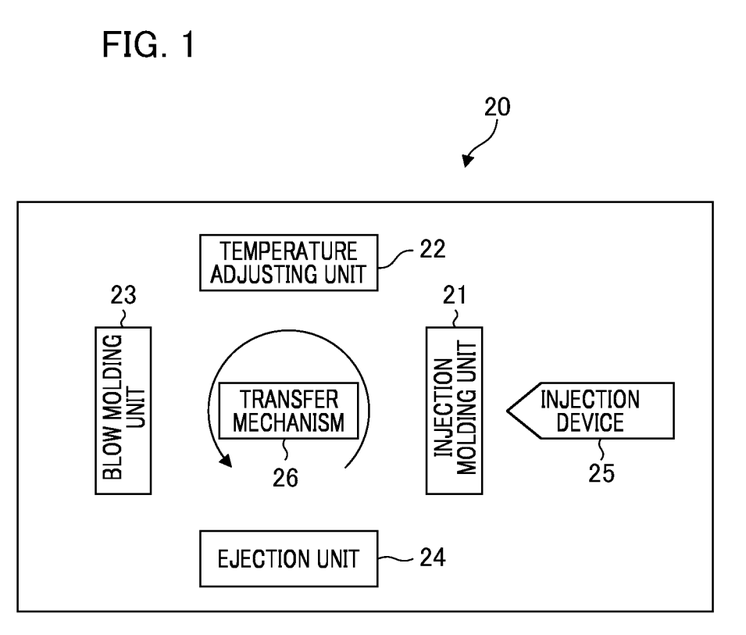
FIG. 1 is a schematic diagram illustrating a configuration of a blow molding apparatus in one embodiment.

FIG. 1 is a schematic diagram illustrating the configuration of the blow molding apparatus in one embodiment. The blow molding apparatus in this embodiment is a "hot parison" process (herein also referred to as a one-stage process) apparatus in which preforms are not cooled down to room temperature and blow-molded into containers utilizing the residual heat (internal energy) from the injection molding step retained in the preforms.

The blow molding apparatus 20 preferably includes four molding stations, specifically, an injection molding unit 21, a temperature adjusting unit 22, a blow molding unit 23, an ejection unit 24, and a transfer mechanism 26. The injection molding unit 21, temperature adjusting unit 22, blow molding unit 23, and ejection unit 24 are disposed in positions rotated by a predetermined angle (of, for example, 90 degrees) around the transfer mechanism 26.

(Transfer Mechanism 26)

The transfer mechanism 26 includes a rotating plate 26a (not shown in FIG. 1) that rotates around an axis perpendicular to the paper plane of FIG. 1. On the rotating plate 26a are arranged neck molds 27 (not shown in FIG. 1) that hold neck parts 12 of preforms 11 or resin containers (hereinafter simply "container") 15, one or more at every predetermined angle. The transfer mechanism 26 rotates the rotating plate 26a and transports preforms 11 (or containers 15), held by the neck molds 27 at their neck parts 12, sequentially from one to another of the injection molding unit 21, temperature adjusting unit 22, blow molding unit 23, and ejection unit 24. The transfer mechanism 26 is also able to move the rotating plate 26a up and down, and to perform operations relating to the closing and opening of the mold (demolding) of the preforms 11 in the injection molding unit 21.

(Injection Molding Unit 21)

Figure 2A:
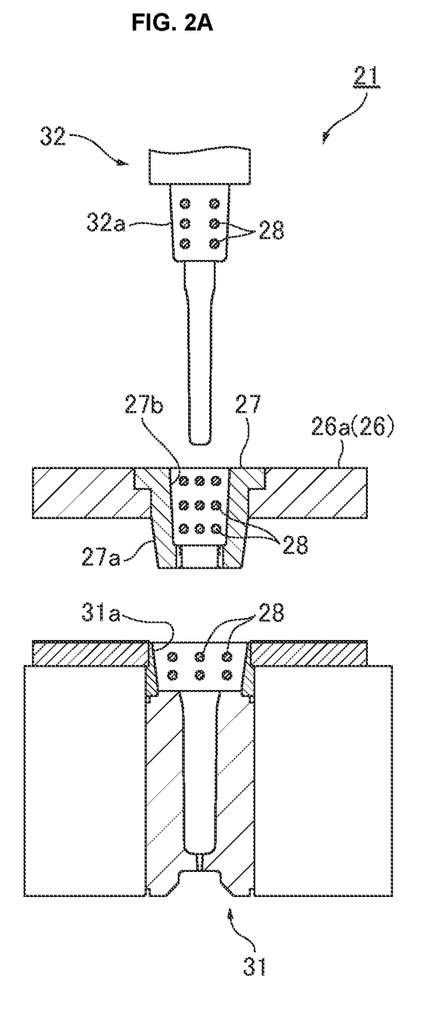
FIGS. 2A and 2B are diagrams illustrating a configuration example of an injection molding unit in this embodiment.
Figure 2B:
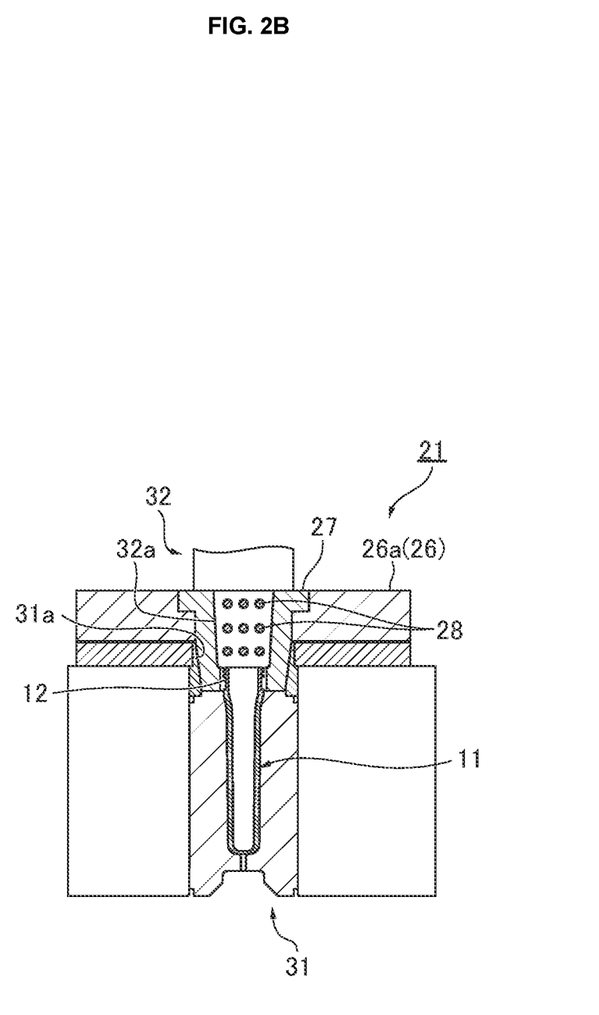

The injection molding unit 21 includes an injection mold cavity 31 and an injection mold core 32 as shown in FIGS. 2A, 2B and produces preforms 11. As shown in FIG. 1, to the injection molding unit 21 is connected an injection device 25 that melts and supplies resin material that is the raw material of the preforms 11.

The preform 11 has an overall cylindrical shape with a bottom, one end open and the other end closed, as shown in FIG. 2B. A neck part 12 is formed at the open end of the preform 11.

The container and preform 11 are made of a thermoplastic synthetic resin. The material may be selected as suited in accordance with the specifications of the container. Concrete examples of the material include PET (polyethylene terephthalate), PEN (polyethylene naphthalate), PCTA (polycyclohexylenedimethylene terephthalate), Tritan (registered trademark, copolyester made by Eastman Chemical Company), PP (polypropylene), PE (polyethylene), PC (polycarbonate), PES (polyethersulfone), PPSU (polyphenylsulfone), PS (polystyrene), COP/COC (cyclic olefin polymer/copolymer), PMMA (polymethyl methacrylate or acrylic), PLA (polylactic acid), and so on. Additives such as colorant may be added to these resin materials as required.

FIG. 2A is a diagram illustrating a state before the mold is closed in the injection molding unit 21, and FIG. 2B is a diagram illustrating a state after the mold has been closed in the injection molding unit 21.

The injection mold cavity 31 is the mold that defines the outer contour of the preform 11 except the neck part 12 and receives the neck mold 27 (i.e., the injection mold cavity 31 abuts against or engages with the neck mold 27). The inner circumference of the neck mold 27 serves as the mold that defines the shape of the neck part 12 of the preform 11. The injection mold core 32 is the mold that defines the inner contour of the preform 11. The injection mold core 32 is inserted into the neck mold 27 from above in the drawing, with the neck mold 27 being set on the injection mold cavity 31 and the molds are closed. The injection mold cavity 31 is one example of a first mold, and the injection mold core 32 is one example of a second mold.

In the injection molding unit 21, the injection mold cavity 31, injection mold core 32, and the neck mold 27 of the transfer mechanism 26 are clamped together to form a mold cavity conforming to the shape of the preform. Preforms 11 are produced at the injection molding unit 21 by injecting resin material from the injection device 25 into this mold cavity in the shape of the preform as shown in FIG. 2B.

Solid lubricants (solid lubricants) 28 are embedded in respective first sliding surfaces between the neck mold 27 and injection mold cavity 31, and second sliding surfaces between the neck mold 27 and injection mold core 32. These solid lubricants embedded in respective sliding surfaces can minimize galling of the mold components in the injection molding unit 21.

For example, as shown in FIG. 2A, a plurality of solid lubricants 28 are embedded at equal intervals in an annular form along the outer circumference of the injection mold core 32 in a tapered proximal end part 32a of the injection mold core 32 that slides against the inner circumferential surface 27b of the neck mold 27. Similarly, a plurality of solid lubricants 28 are embedded at equal intervals in an annular form along the inner circumference of the injection mold cavity 31 in a tapered bearing surface 31a of the injection mold cavity 31 that receives the neck mold 27.

In each sliding surface, the solid lubricants 28 are arranged at intervals also in the axial direction along which the components slide against each other. The number of solid lubricants arranged in the axial direction is suitably set in accordance with the axial length of the sliding surface.

Figure 3A:
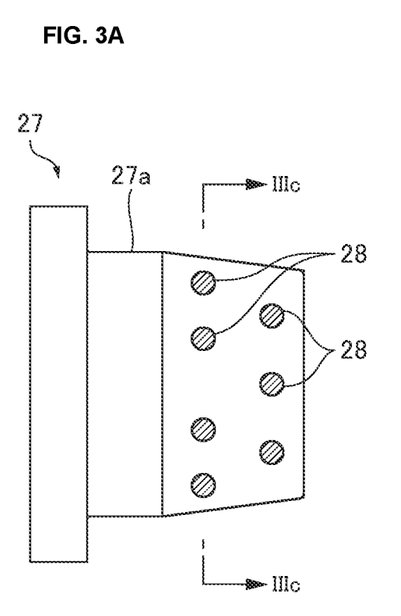
FIGS. 3A to 3D are diagrams illustrating a configuration example of a neck mold.
Figure 3B:
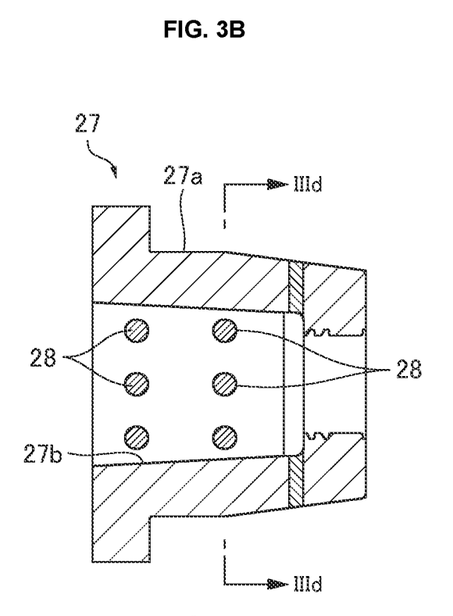
Figure 3C:
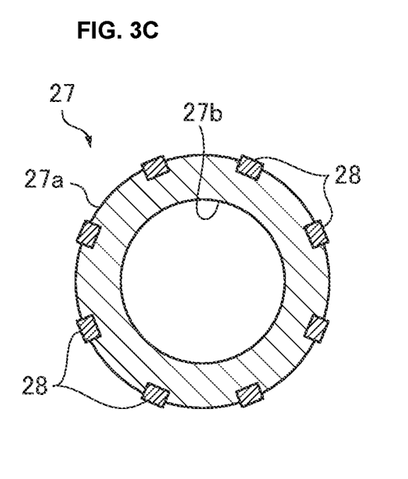
Figure 3D:
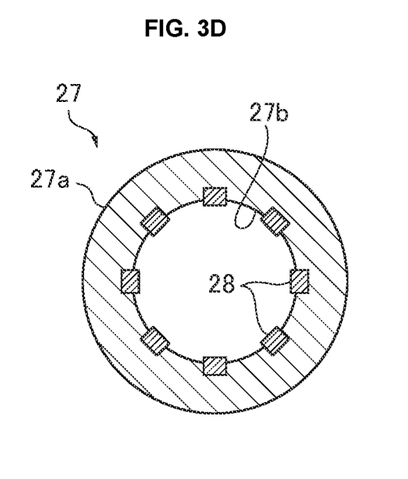

FIG. 3A is a diagram illustrating the outer appearance of the neck mold 27. FIG. 3B is a longitudinal cross-sectional view of FIG. 3A. FIG. 3C is a lateral cross-sectional view of line IIIc-IIIc in FIG. 3A, and FIG. 3D is a lateral cross-sectional view of line IIId-IIId in FIG. 3C.

As shown in FIG. 3A, a plurality of solid lubricants 28 are embedded in the outer circumferential surface 27a of the neck mold 27 that faces the bearing surface 31a of the injection mold cavity 31. As shown in FIG. 3C, the solid lubricants 28 embedded in the outer circumferential surface 27a of the neck mold 27 are arranged at equal intervals in an annular form along the outer circumference of the neck mold 27. Similarly, a plurality of solid lubricants 28 are embedded in the inner circumferential surface 27b of the neck mold 27 that faces the proximal end part 32a of the injection mold core 32 as shown in FIG. 3B. As shown in FIG. 3D, the solid lubricants 28 embedded in the inner circumferential surface 27b of the neck mold 27 are arranged at equal intervals in an annular form along the inner circumference of the neck mold 27.

The solid lubricant 28 described above is made of powder containing, for example, a main ingredient such as carbon material powder, graphite powder, molybdenum sulfide, polytetrafluoroethylene, paraffin, or the like and a binder, and produced by sintering the powder that has been packed and molded into a predetermined shape and demolded. The solid lubricants 28 may be anchored to the mold components by press-fitting them into the mold components, or may be fixed using an adhesive.

Solid lubricants 28 similar to those in the injection molding unit 21 are given the same reference numeral and repetitive descriptions of their configuration will be omitted in the following.

The neck mold 27 of the transfer mechanism 26 stays closed even after the molds are opened in the injection molding unit 21, and keeps holding the neck part 12 and transfers the preform 11. The number of preforms 11 that can be molded simultaneously in the injection molding unit 21 (i.e., the number of containers 15 that can be molded simultaneously in the blow molding apparatus 20) may be suitably set.

(Temperature Adjusting Unit 22)

The temperature adjusting unit 22 adjusts the temperature of the preform 11 produced at the injection molding unit 21 to temperature suited for final blowing (about 90° C. to 105° C., for example) by making the temperature of the preform 11 uniform or by removing temperature variations. The temperature adjusting unit 22 also serves to cool down hot preforms 11 after the injection molding.

Figure 4A:
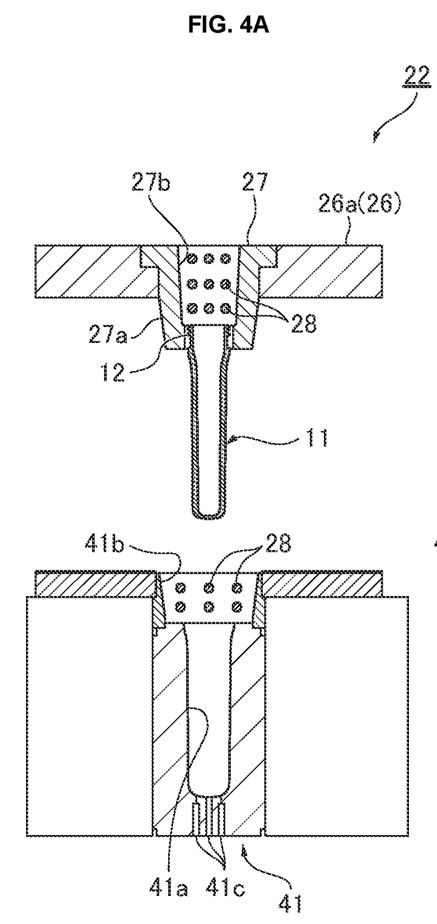
FIGS. 4A and 4B are diagrams illustrating a configuration example of a temperature adjusting unit in this embodiment.
Figure 4B:
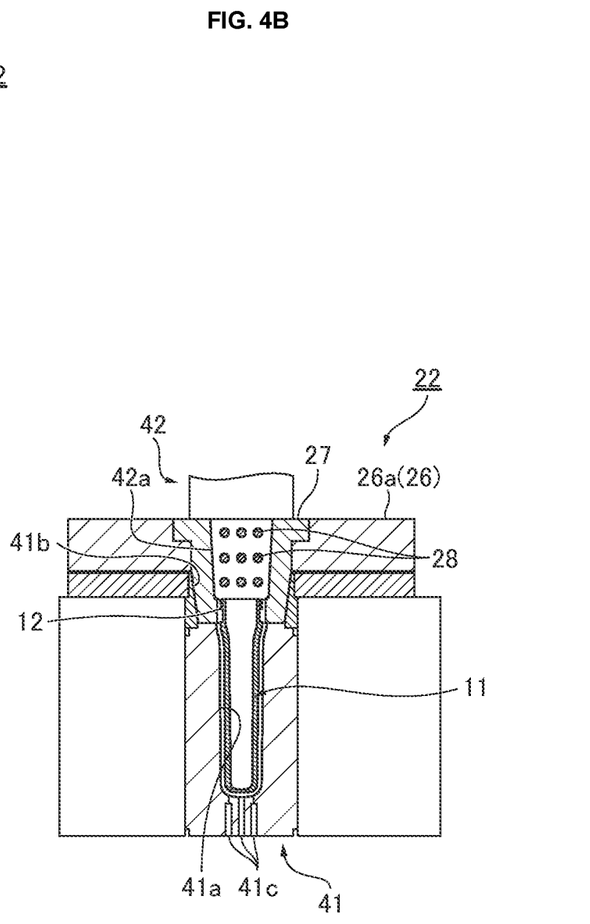

As shown in FIGS. 4A and 4B, the temperature adjusting unit 22 includes a cavity 41 and a core 42. The cavity 41 is one example of a first mold, and the core 42 is one example of a second mold.

The cavity 41 is a mold having a temperature adjusting space 41a of substantially the same shape as that of the preform 11 produced at the injection molding unit 21, i.e., is able to accommodate a preform 11 inside. Air outlet holes 41c are formed in a bottom part of the temperature adjusting space 41a of the cavity 41 for letting out the air as the preform 11 is being inserted.

The core 42 is a mold to be inserted into the preform 11, and disposed such as to be moved to and from the neck mold 27 holding the preform 11 at the temperature adjusting unit 22. In FIG. 4A, the core 42 is retracted and not shown. FIG. 4B on the other hand shows a state in which the core 42 has moved downward in the drawing and is inserted into the neck mold 27.

The cavity 41 and the core 42 each have a flow passage (not shown) inside for a temperature adjusting medium (cooling medium) to flow through. Therefore the cavity 41 and the core 42 are maintained at a predetermined temperature by the temperature adjusting medium flowing inside. The preform 11 at the temperature adjusting unit 22 is adjusted to a predetermined temperature by heat exchange between the cavity 41 facing the preform on the outside and the core 42 facing the preform on the inside.

Solid lubricants 28 are embedded in respective first sliding surfaces between the neck mold 27 and the cavity 41, and second sliding surfaces between the neck mold 27 and the core 42. These solid lubricants 28 embedded in respective sliding surfaces can minimize galling of the mold components in the temperature adjusting unit 22.

For example, as shown in FIG. 4B, a plurality of solid lubricants 28 are embedded at equal intervals in an annular form along the outer circumference of the core 42 in a tapered proximal end part 42a of the core 42 that slides against the inner circumferential surface 27b of the neck mold 27. Similarly, as shown in FIG. 4A, a plurality of solid lubricants 28 are embedded at equal intervals in an annular form along the inner circumference of the cavity 41 in a tapered bearing surface 41b of the cavity 41 that receives the neck mold 27. As described in the foregoing, solid lubricants 28 are embedded in the outer circumferential surface 27a and inner circumferential surface 27b of the neck mold 27 that transfers the preform 11.

(Blow Molding Unit 23)

Referring back to FIG. 1, the blow molding unit 23 performs blow molding to the preform 11 that is temperature-adjusted at the temperature adjusting unit 22, to produce containers.

Figure 5A:
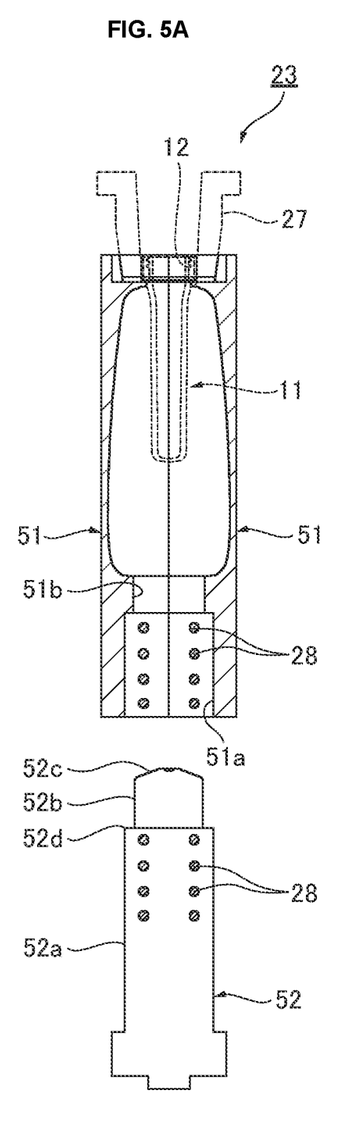
FIGS. 5A and 5B are diagrams illustrating a configuration example of a blow molding unit in this embodiment.
Figure 5B:
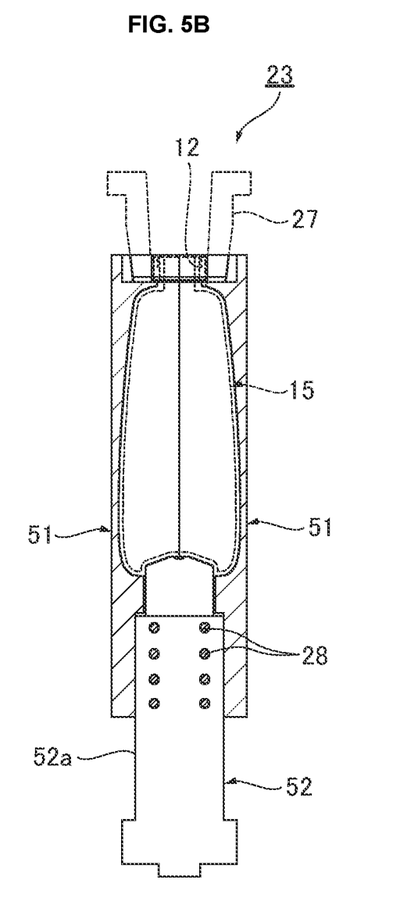

The blow molding unit 23 includes a blow mold cavity 51 that is a pair of split mold halves corresponding to the shape of the container 15, a bottom mold 52, and an air injection member (not shown) that doubles as a stretch rod. FIG. 5A illustrates a state before the blow mold cavity 51 and bottom mold 52 are closed, and FIG. 5B illustrates a state after the blow mold cavity 51 and bottom mold 52 have been closed.

The blow mold cavity 51 a mold part that defines the shape of the container 15 except for the bottom surface. The blow mold cavity 51 is split in a parting plane along the up-down direction in FIGS. 5A and 5B and configured to be opened and closed in the left-right direction in FIGS. 5A and 5B. The blow mold cavity 51 is one example of a first mold.

The bottom mold 52 is a mold that defines the shape of the bottom surface of the container 15 and is disposed below the blow mold cavity 51. A mold cavity that defines the shape of the container 15 is formed by the bottom mold 52 and the blow mold cavity 51 being closed. The bottom mold 52 waits below the preform 11 where it does not touch the bottom of the preform 11 before the blow mold cavity 51 is closed, for example, and is driven to move up quickly to a molding position (FIG. 5B) after the mold is closed.

The air injection member, which is a hollow tubular body for blowing air into the preform, is brought into contact with the neck part of the preform. The air injection member is movable up and down in the drawing and serves to stretch the preform 11 along the vertical axis by moving down. The air injection member is one example of a second mold.

Solid lubricants 28 are embedded in third sliding surfaces between the blow mold cavity 51 and the bottom mold 52. These solid lubricants 28 embedded in the sliding surfaces can minimize galling of the mold components of the blow mold cavity 51 and bottom mold 52. Although not shown in FIGS. 5A and 5B, solid lubricants 28 are embedded in respective first sliding surfaces between the blow mold cavity 51 and the outer circumferential surface 27a of the neck mold 27, and second sliding surfaces between the inner circumferential surface 27b of the neck mold 27 and the air injection member.

For example, as shown in FIG. 5A, a plurality of solid lubricants 28 are embedded at equal intervals in an annular form along the outer circumference of the bottom mold 52 in a cylindrical or tapered proximal end part (contact part) 52a of bottom mold 52 that slides against the blow mold cavity 51. On the other hand, a plurality of solid lubricants 28 are embedded at equal intervals in an annular form along the inner circumference of a cylindrical or tapered opening 51a in the blow mold cavity 51 that receives the proximal end part 52a of the bottom mold 52 (bearing surface that receives the proximal end part 52a of the bottom mold 52).

The bottom mold 52 further includes a forming part 52c that defines the bottom surface shape of the container 15, a cylindrical or tapered middle part 52b that connects the forming part 52c and the proximal end part 52a, and a step 52d that connects the middle part 52b and the proximal end part 52a and defines an uppermost position of the bottom mold 52. The proximal end part 52a has a larger diameter than the middle part 52b. The blow mold cavity 51 further includes a second opening 51b that is cylindrical or tapered in a portion that faces or opposes the middle part 52b when the mold is closed. The opening 51a has a larger diameter than the second opening 51b. No solid lubricants 28 are embedded in the outer circumferential surface of the middle part 52b and the inner circumferential surface of the second opening 51b and they are configured such that there is a predetermined gap between them, this gap serving as an air vent.

(Ejection Unit 24)

The ejection unit 24 is configured to release the neck part 12 of the container produced at the blow molding unit 23 from the neck mold 27 and allow the container to be taken out of the blow molding apparatus 20.

(Description of Blow Molding Method)

Next, a blow molding method using the blow molding apparatus 20 of this embodiment is described.

Figure 6:
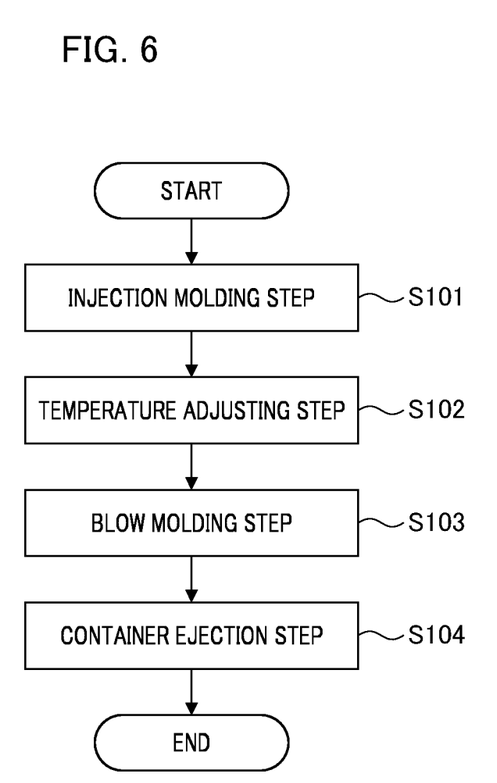
FIG. 6 is a flowchart illustrating the steps of a blow molding method.

FIG. 6 is a flowchart illustrating the steps of the blow molding method.

(Step S101: First Injection Molding Step)

First, resin material is injected from the injection device 25 into the mold cavity formed by the injection mold cavity 31, injection mold core 32, and the neck mold 27 of the transfer mechanism 26 at the injection molding unit 21 to produce a preform 11.

After the molds are opened in the injection molding unit 21, the rotating plate 26a of the transfer mechanism 26 rotates a predetermined angle so that the preform 11 held by the neck mold 27 and containing the residual heat from the injection molding step is transferred to the temperature adjusting unit 22.

(Step S102: Temperature Adjusting Step)

Next, at the temperature adjusting unit 22, the temperature of the preform 11 is adjusted to be closer to a temperature suitable for final blow molding.

In the temperature adjusting step, first, the preform 11 is accommodated inside the temperature adjusting space 41a of the cavity 41. Next, the core 42 is inserted into the preform 11 held in the cavity 41.

Since the cavity 41 and the core 42 are configured to conform to the shape of the preform 11, the preform 11 remains in a desired shape even during the temperature adjusting step.

The preform 11 faces the cavity 41 and the core 42 during the temperature adjusting step so that the temperature of the preform 11 is adjusted such as not to fall below a temperature suitable for blow molding, and also any unevenness in temperature that occurred during the injection molding is reduced.

After that, the rotating plate 26a of the transfer mechanism 26 rotates a predetermined angle so that the preform 11, whose temperature has been adjusted, held by the neck mold 27, is transferred to the blow molding unit 23.

(Step S103: Blow molding step)

Next, blow molding of a container 15 is performed at the blow molding unit 23.

First, the blow mold cavity 51 is closed to accommodate the preform 11 in the mold cavity. In the case where the preform 11 is longer than the container 15, the bottom mold 52 waits below far enough not to touch the bottom part of the preform 11 before the blow mold cavity 51 is closed. After the blow mold cavity 51 is closed, the bottom mold 52 is then quickly lifted to a molding position.

The air injection member (blow mold core) is brought down approximately at the same time as the blow mold cavity 51 and bottom mold 52 are closed, and brought into contact with the neck part 12 of the preform 11. The stretch rod is moved down to press the bottom part of the preform 11 from inside, and air is blown into the preform from the air injection member to stretch the preform 11 inside the mold cavity in the horizontal axis, while also stretching the preform in the vertical axis as required. The preform 11 is thus inflated to make tight contact with the mold cavity formed by the blow mold cavity 51 and the bottom mold 52 and formed into the desired shape, i.e., blow-molded into the container 15.

(Step S104: Container ejection step)

After the blow molding has ended, the molds are opened in the blow molding unit 23. This allows the container 15 to be moved away from the blow molding unit 23.

Successively, the rotating plate 26a of the transfer mechanism 26 rotates a predetermined angle so that the container 15 is transferred to the ejection unit 24. At the ejection unit 24, the neck part 12 of the container 15 is released from the neck mold 27, and the container 15 is taken out of the blow molding apparatus 20.

A series of blow molding process steps is thus complete. The rotating plate 26a of the transfer mechanism 26 is then rotated a predetermined angle, whereupon the steps S101 to S104 described above are repeated.

The present invention is not limited to the embodiment described above. Various improvements and design changes may be made without departing from the subject matter of the present invention.

In the above embodiment, one example was described in which solid lubricants 28 are embedded in both of the two mold components sliding against each other. Instead, the solid lubricants 28 may be embedded in only one of the two mold components sliding against each other. Alternatively, the mold for the injection molding, for example, may have solid lubricants 28 embedded in one of the first sliding surface between the neck mold 27 and the injection mold cavity 31 and the second sliding surface between the neck mold 27 and the injection mold core 32, and may not have solid lubricants in the other.

A blow molding apparatus 20 that uses the mold according to the present invention may be equipped with a plurality of injection molding units upstream of the temperature adjusting unit 22 to mold multilayer preforms 11 by performing injection molding twice or more, for example (which would be a "hot parison" process blow molding apparatus with 5 or 6 molding stations). Another alternative is an apparatus configuration without the temperature adjusting unit 22 (which would be a "hot parison" process blow molding apparatus with three molding stations, i.e., an injection molding unit 21, a blow molding unit 23, and an ejection unit 24).

Figure 7A:
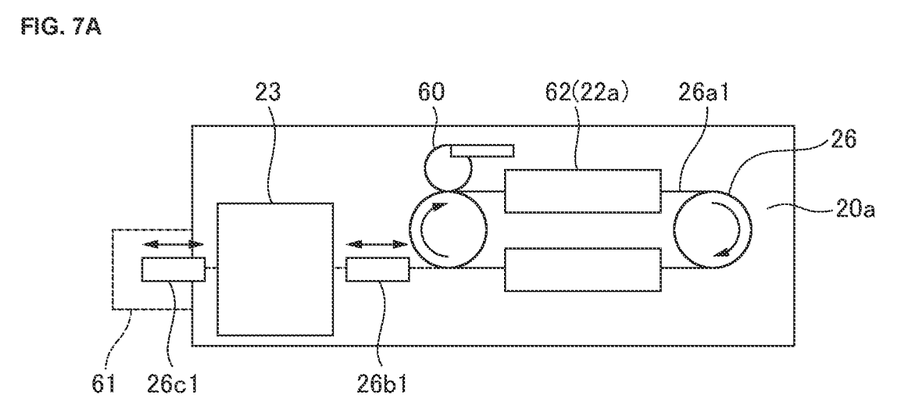
FIG. 7A is a schematic diagram illustrating a configuration of a two-stage blow molding apparatus.

The mold according to the embodiment may also be applied to a blow molding apparatus without an injection molding unit. FIG. 7A is a diagram illustrating a schematic configuration of a two-stage ("cold parison") process blow molding apparatus 20a.

The blow molding apparatus 20a includes a preform supply unit 60, a blow molding unit 23, a heating unit 62 (temperature adjusting unit 22a in a broader sense), a transfer mechanism 26, and a container ejection unit 61. The heating unit 62 includes a looped heated transfer path, and a heating device (not shown) such as an infrared heater that can heat up the body part of the preform to a temperature suitable for blowing. The transfer mechanism 26 includes a first holding member 26a1 disposed in the heating unit 62 for holding a preform received from the preform supply unit 60 and transports the same, a second holding member 26b1 that receives the preform from the heating unit 62 and transports the same to the blow molding unit 23, and a third holding member 26c1 that transports the container from the blow molding unit 23 to the container ejection mechanism 61. The mold used in the blow molding unit 23 of the blow molding apparatus 20a has the same configuration as that of the embodiment described in the foregoing.

The preform supply unit 60 receives preforms (made of PET, for example) that were produced and prepared beforehand in an injection molding apparatus elsewhere, and loads the same onto the first holding member 26a1. The container ejection unit 61 includes a container holding part (not shown) disposed adjacent the blow molding unit 23 for receiving containers that were produced in the blow molding unit 23 and transported thereto by the third holding member 26c1. The heating unit 62 heats the preform held on the first holding member 26a1, as the preform is spun and transported inside the heating device.

In this blow molding apparatus 20a, preforms fed by the preform supply unit 60 are heated in the heating unit 62 up to a temperature suited for blowing (100 to 110° C., for example), after which the preforms are transferred to the blow molding unit 23. In the blow molding unit 23, the preform is accommodated in a mold made up of a blow mold cavity 51 and a bottom mold 52, and blow-molded into a container of a desired shape. After the blow molding, the containers are transferred to the container ejection unit 61.

Figure 7B:
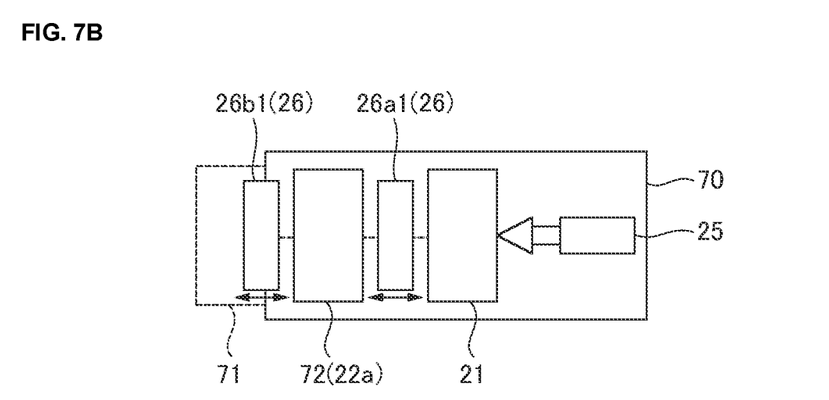
FIG. 7B is a schematic diagram illustrating a configuration of a two-stage injection molding apparatus.

The mold according to the embodiment may also be applied to an injection molding apparatus without a blow molding unit. FIG. 7B is a schematic diagram illustrating the configuration of a two-stage injection molding apparatus 70.

The injection molding apparatus 70 includes an injection molding unit 21, an ejection unit 71, a cooling unit 72 (temperature adjusting unit 22a in a broader sense), and a transfer mechanism 26. The cooling unit 72 includes a cooling pot (not shown) that accommodates the preform to cool the body part of the preform from outside, and a cooling rod (not shown) inserted into the hollow body part of the preform to cool the body part from inside. The transfer mechanism 26 includes a first holding member 26a1 that transports the preform from the injection molding unit 21 to the cooling unit 72, and a second holding member 26b1 that transports the preform from the cooling unit 72 to the ejection unit 71. To the injection molding unit 21 is connected an injection device 25. The mold used in the injection molding unit 21 of the injection molding apparatus 70 has the same configuration as that of the embodiment described in the foregoing.

The injection molding apparatus 70 carries out injection molding of preforms, wherein a resin material (PET, for example) is injected from the injection device 25 into a mold cavity formed by a neck mold 27, an injection mold cavity 31, and an injection mold core 32 that are clamped together in the injection molding unit 21. The preforms are then removed in a hot state (with the outer surface temperature in the body part being 100 to 130° C., for example), after which they are transferred to the cooling unit 72. At the cooling unit 72, the preforms are cooled to the extent that no shrinkage deformation such as sink marks will occur if left under normal temperature (with the outer surface temperature in the body part being 50 to 60° C., for example). Once the preforms are sufficiently cooled, they are transported to the ejection unit 71 next.

Further, the embodiments disclosed herein should be considered illustrative in all aspects and not limiting. The scope of the present invention is defined not by the description above but by the claims, which are intended to include all changes that come within the meaning and range of equivalency of the claims.

The invention claimed is:

1. A mold comprising:
   an injection molding mold used for injection molding of a resin preform having a bottom,
   a temperature adjusting mold that is different from the injection molding mold and used to cool down the preform demolded after injection molding, and
   a neck mold that is commonly used between the injection molding mold and the temperature adjusting mold and holds a neck part of the preform to transport the preform from the injection molding mold to the temperature adjusting mold,
   wherein the injection molding mold includes an injection core mold that is inserted into the inner circumference of the neck mold and an injection cavity mold that receives the outer circumference of the neck mold,
   the temperature adjusting mold includes a temperature adjusting core mold that is inserted into the inner circumference of the neck mold and a temperature adjusting cavity mold that receives the outer circumference of the neck mold, and
   solid lubricants are embedded in the outer and inner surfaces of the neck mold, respectively.

2. The mold according to claim 1, wherein
   the mold further comprises a blow molding mold used for blow molding of the preform, and
   the blow molding mold includes a blow core mold that is inserted into the inner circumference of the neck mold and a blow cavity mold that receives the outer circumference of the neck mold.

3. The mold according to claim 2, wherein
   the blow molding mold further includes a bottom mold inserted into the blow cavity mold and defining a bottom surface shape of a blow-molded container, and
   the solid lubricant is embedded in the sliding surface between the blow cavity mold and the bottom mold.

4. A blow molding apparatus comprising the mold according to claim 2.

5. An injection molding apparatus comprising the mold according to claim 1.

* * * * *